July 19, 1966  G. L. GOUGH  3,262,035
POSITIONAL CONTROL SYSTEM
Filed May 24, 1961  10 Sheets-Sheet 1
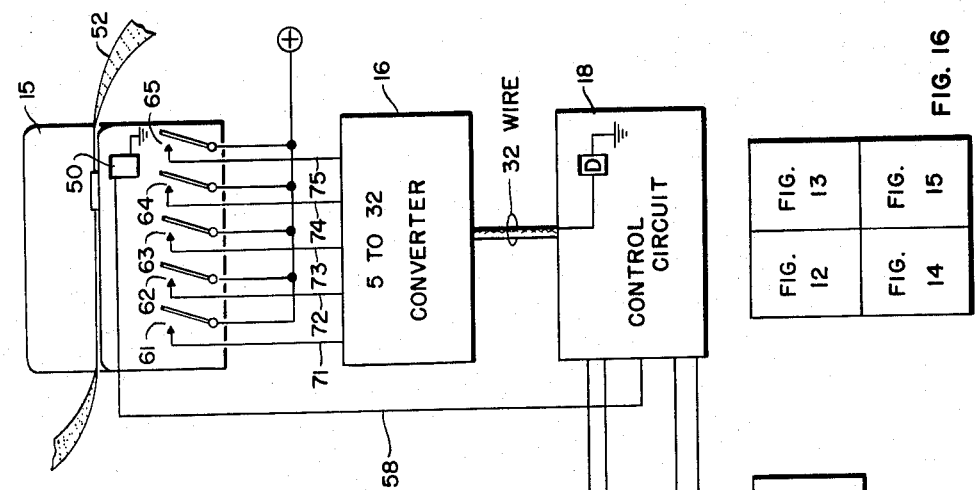
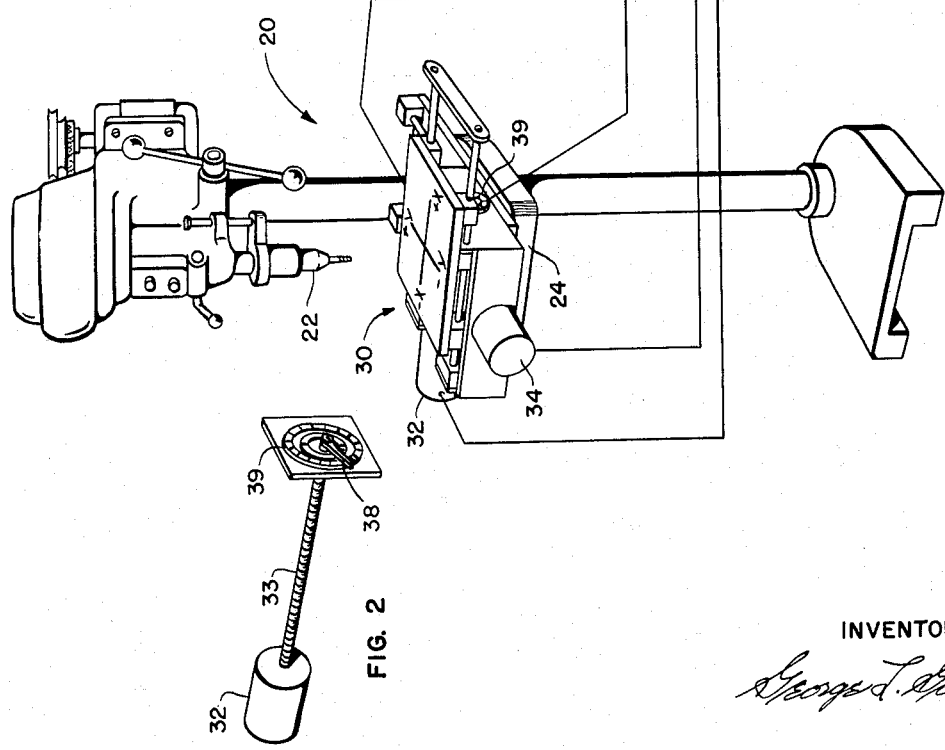
INVENTOR
George L. Gough

July 19, 1966  G. L. GOUGH  3,262,035
POSITIONAL CONTROL SYSTEM
Filed May 24, 1961  10 Sheets-Sheet 4

INVENTOR

George L. Gough

July 19, 1966  G. L. GOUGH  3,262,035
POSITIONAL CONTROL SYSTEM
Filed May 24, 1961  10 Sheets-Sheet 5

INVENTOR
George L. Gough

July 19, 1966    G. L. GOUGH    3,262,035
POSITIONAL CONTROL SYSTEM
Filed May 24, 1961    10 Sheets-Sheet 6

INVENTOR
George L. Gough

July 19, 1966    G. L. GOUGH    3,262,035
POSITIONAL CONTROL SYSTEM
Filed May 24, 1961    10 Sheets-Sheet 9

INVENTOR
George L. Gough

United States Patent Office 3,262,035
Patented July 19, 1966

3,262,035
POSITIONAL CONTROL SYSTEM
George L. Gough, 3955 W. Lake Ave., Glenview, Ill.
Filed May 24, 1961, Ser. No. 120,837
21 Claims. (Cl. 318—19)

This invention relates to machine control systems and, in particular, to an automatic machine control system for moving a driven element, such as a work table of a machine tool, along a path with respect to X and Y axes in accordance with data programmed in a storage medium, such as punch tape.

In the machine tool field, the vast majority of automation systems are highly complex, and, consequently, highly expensive. Many systems employ electrical circuitry extensively while others utilize electromechanical and magnetic devices to a high degree. A particular problem in the machine tool field is the provision of control elements for controlling and moving a work table in incremental movements and for controlling and moving the work table in lengthy movements. The incremental movements, in general, are movements wherein the driving member such as a table motor rotates for a fractional part of a revolution, and the lengthy movements require that the table motor make a predetermined number of complete revolutions. Typically, decimal counters, binary counters, servo motors and even analog computers are employed to control such lengthy work table movements.

The fundamental object of this invention is to provide a simple and inexpensive automatic machine tool system.

A further object of the invention is to provide a simple and inexpensive machine control system for moving a work table in lengthy movements.

A further object of the invention is to utilize automation data which an automatic machine control system is not programmed to recognize in order to control the movements of a work table.

A further object of the invention is to provide a control circuit for moving a work tool automatically into engagement with a work piece clamped to a work table and in timed relation with the automated movements of the work table.

A still further object of the invention is to provide a commutator wherein the smallest number possible of electric control elements, such as a relay, can be utilized to establish a predetermined number of electrical connections or circuits.

A still further object of the invention is to provide an automatic machine control system capable of positioning a work table in accordance with automation data contained in a storage medium and being capable of reproducing the automation data contained in a storage medium.

An even further object of the invention is to provide an automatic machine control system including a plug board capable of interconnecting the system so as to control the movements of a work table in accordance with automation data contained in a storage medium and also capable of interconnecting the system so as to reproduce the automation data contained in the storage medium.

An automatic machine control system for moving a movable element, such as a work table, along a path with respect to X and Y axes and which embodies certain features of the invention may include a storage medium containing predetermined movements of the movable element in a permutative form, a device for sensing or reading the stored permutations and for translating the permutations into control signals, and driving members for accepting the control signals and for moving the movable element in accordance with the output signals. The device for translating the permutations into control signals may include a commutator so constructed as to permit the use of the minimum number of control elements, e.g., relays, to be used to establish a predetermined number of electric connections or energization paths to provide incremental movements of the work table.

Further, the system may include control devices programmed to recognize a portion of the automation data contained in the storage medium and to control the table movements accordingly, and to also control the work table movements in accordance with automation data the control system is not programmed to recognize.

In addition, the control circuit may include a plug board for interconnecting the system to control the movements of a work table in accordance with automation data contained in a storage medium and for interconnecting the system so as to permit the system to reproduce the automation data contained in the storage medium.

Also, the control system may include a circuit for automatically controlling the movements of a spindle, i.e., cause the spindle to move a work tool secured therein into engagement with a work piece secured to the work table in timed relation with the automated movements of the work table.

A more complete understanding may be obtained of the present invention from the following detailed description when read in conjunction with the appended drawings in which:

FIG. 1 is a perspective of a machine tool and the present control system being shown in block diagram with portions being shown in detail;

FIG. 2 is a perspective of a motor, driving shaft and associated commutator for driving the work table shown in FIG. 1;

Figure 3:
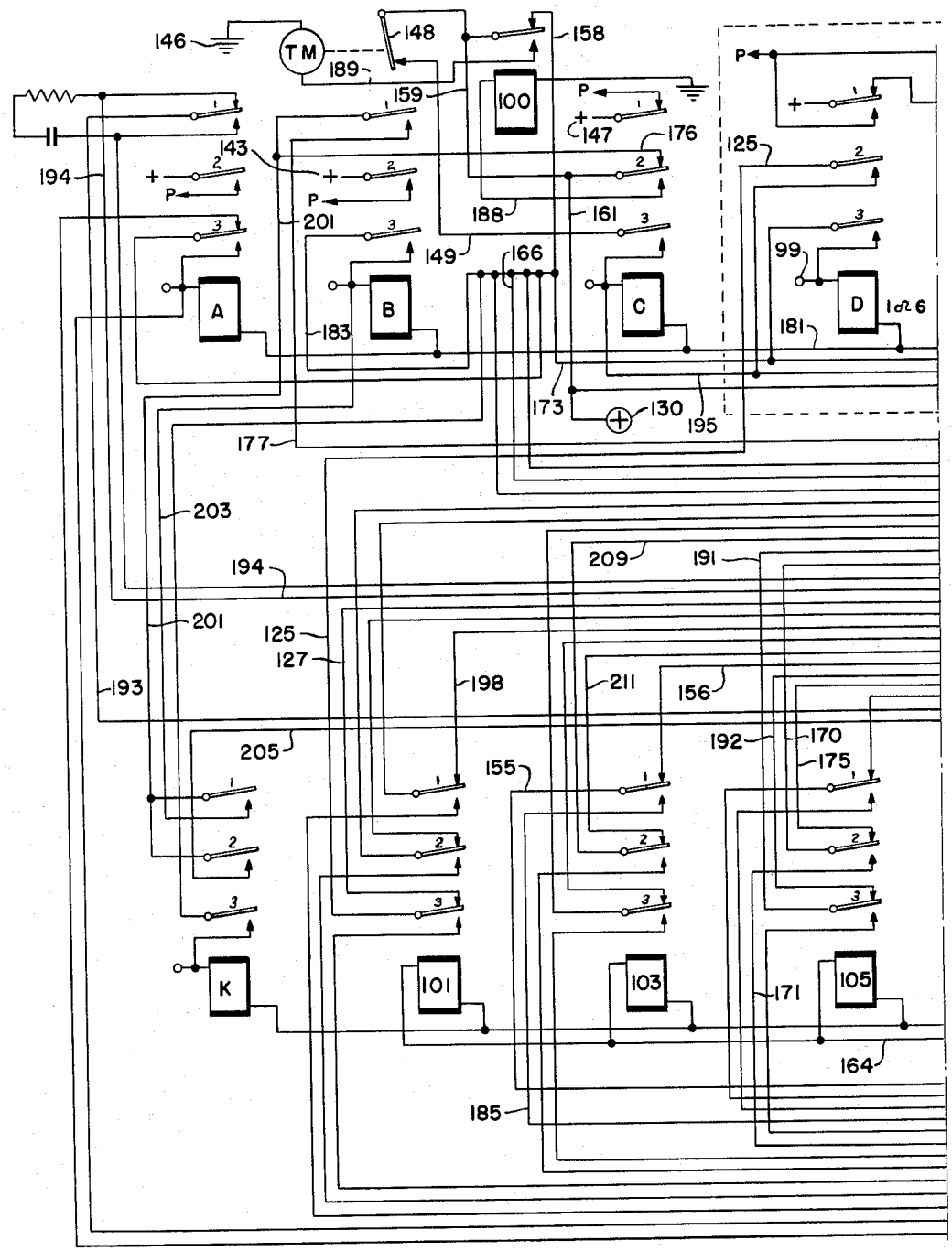
Figure 4:
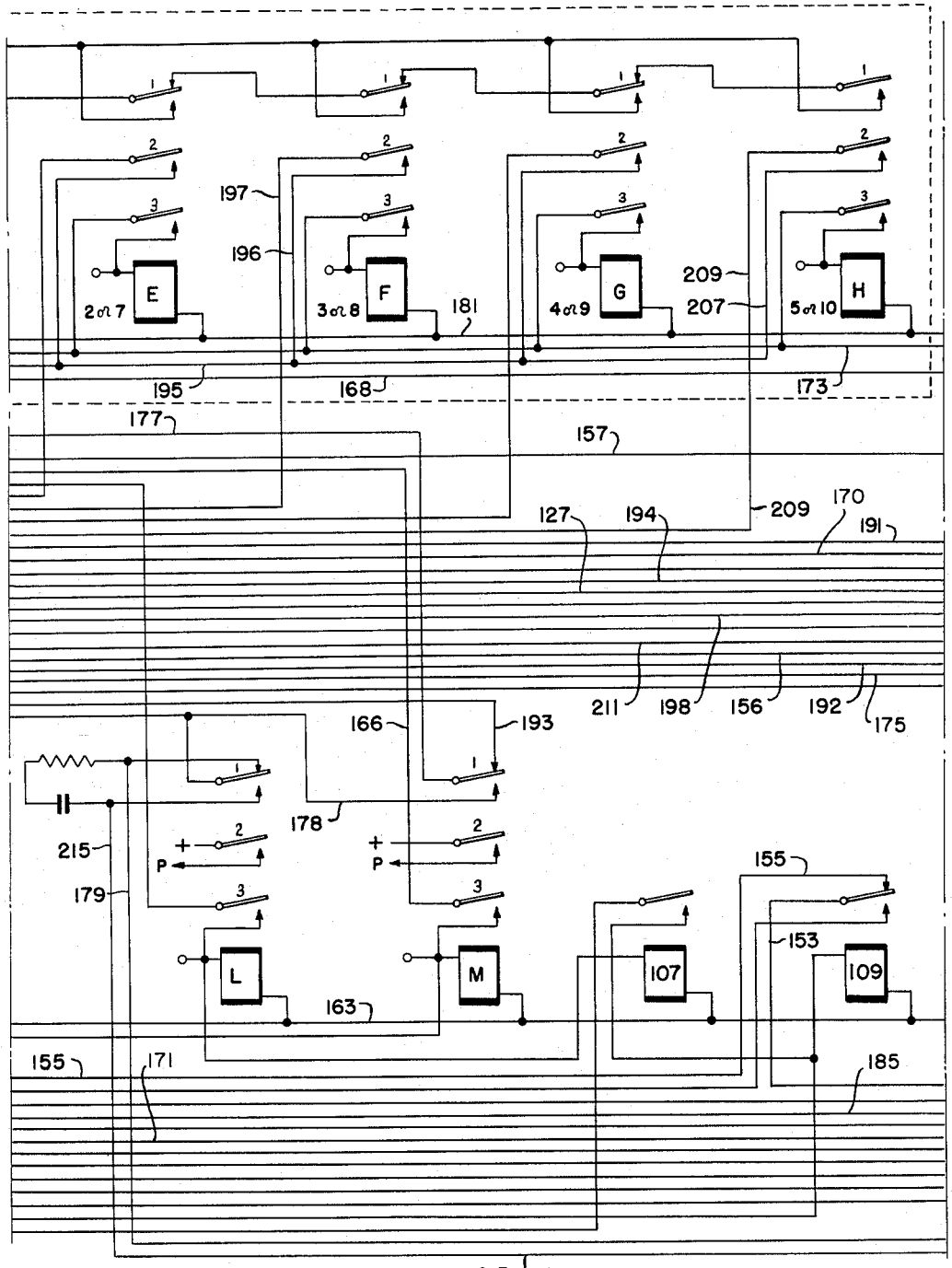
Figure 5:
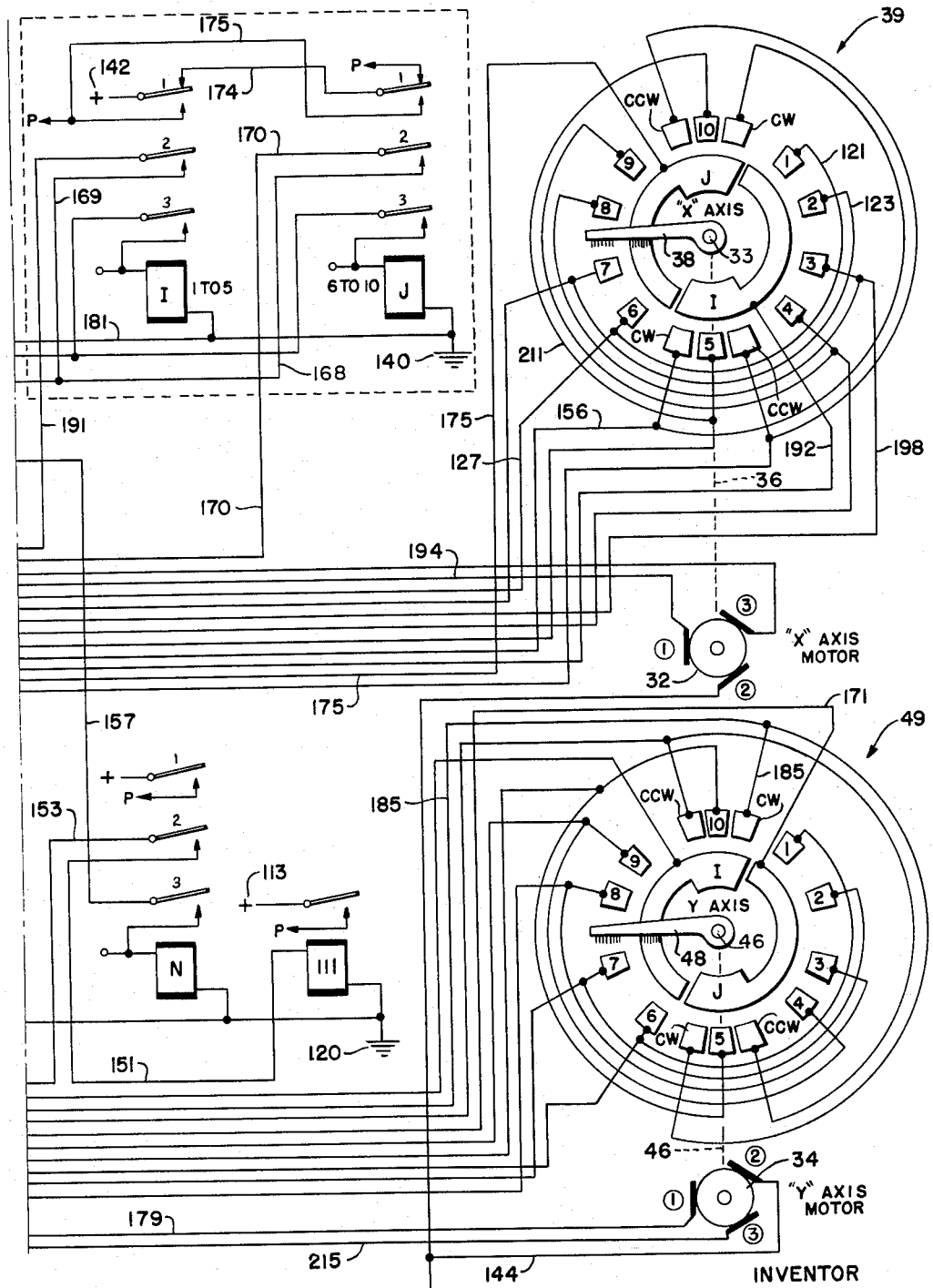
Figure 6:
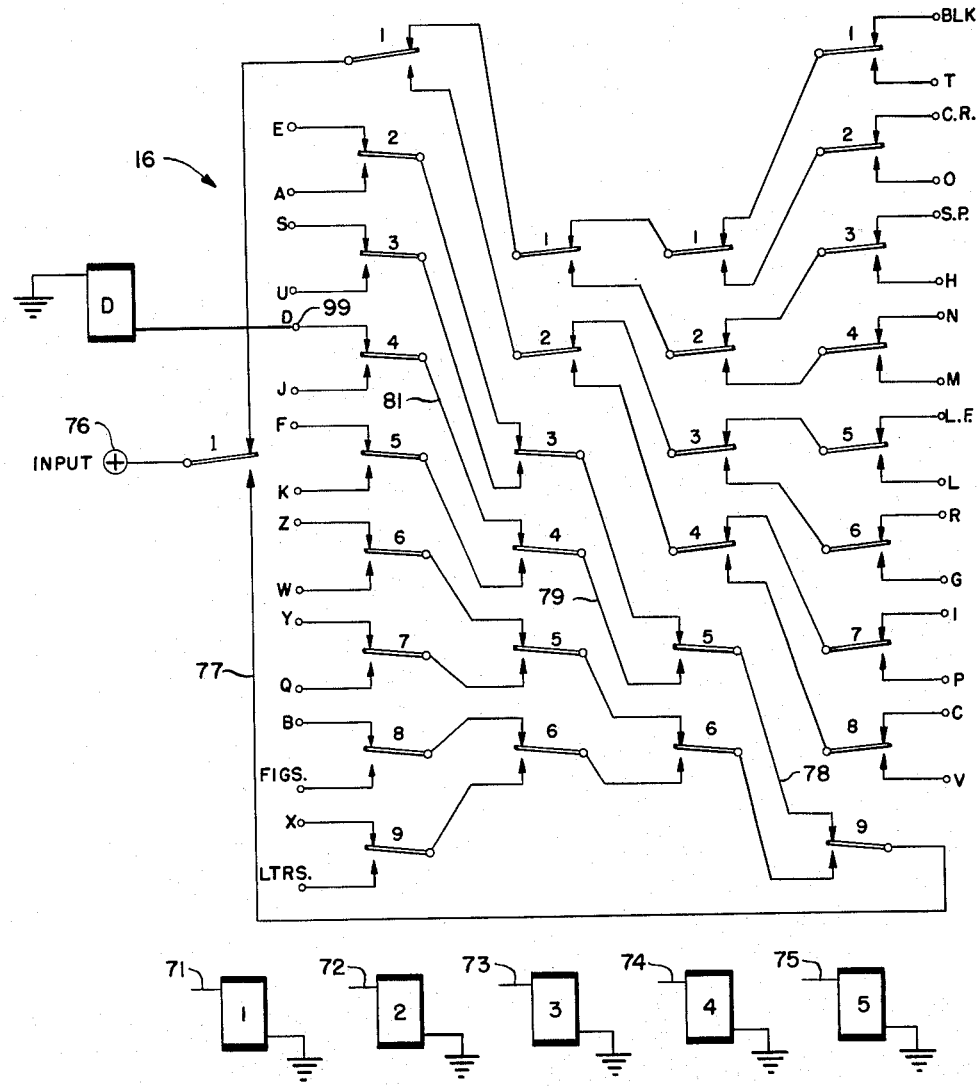
Figure 7:
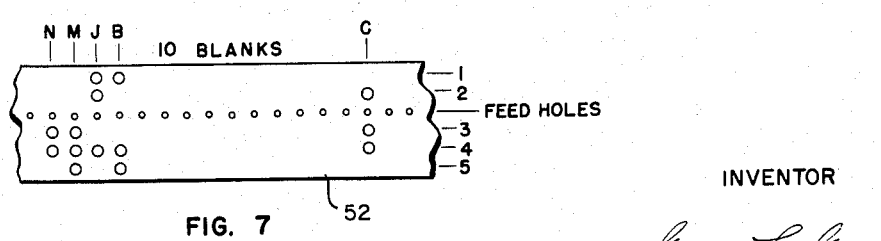
Figure 8:
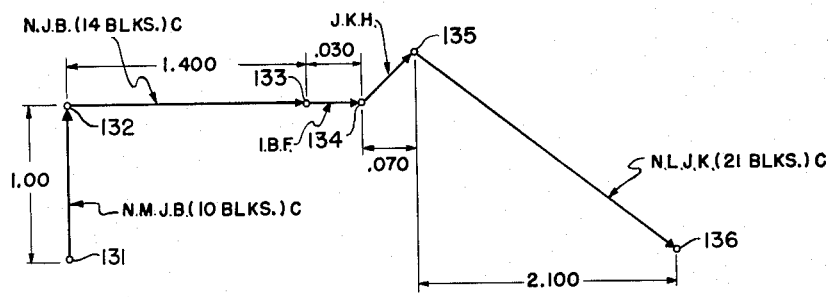
Figure 9:
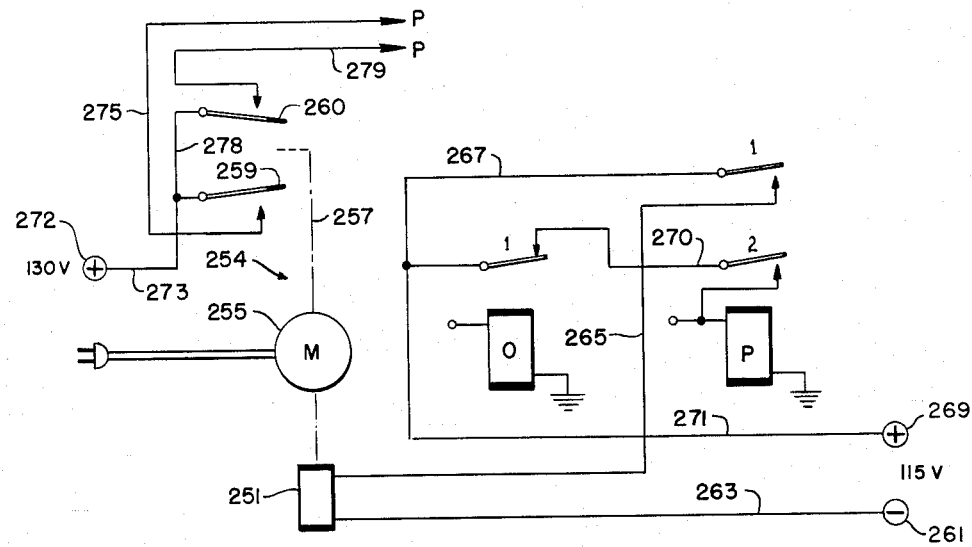
Figure 10:
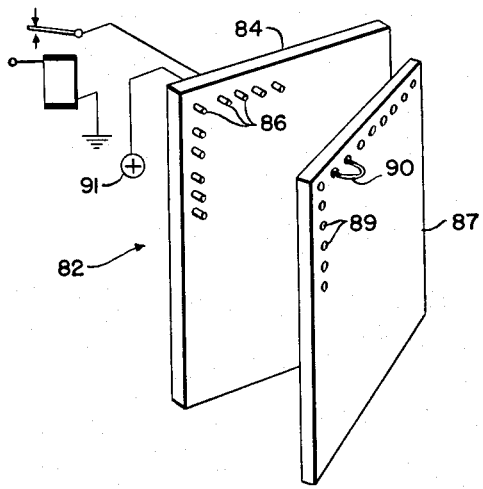
Figure 12:
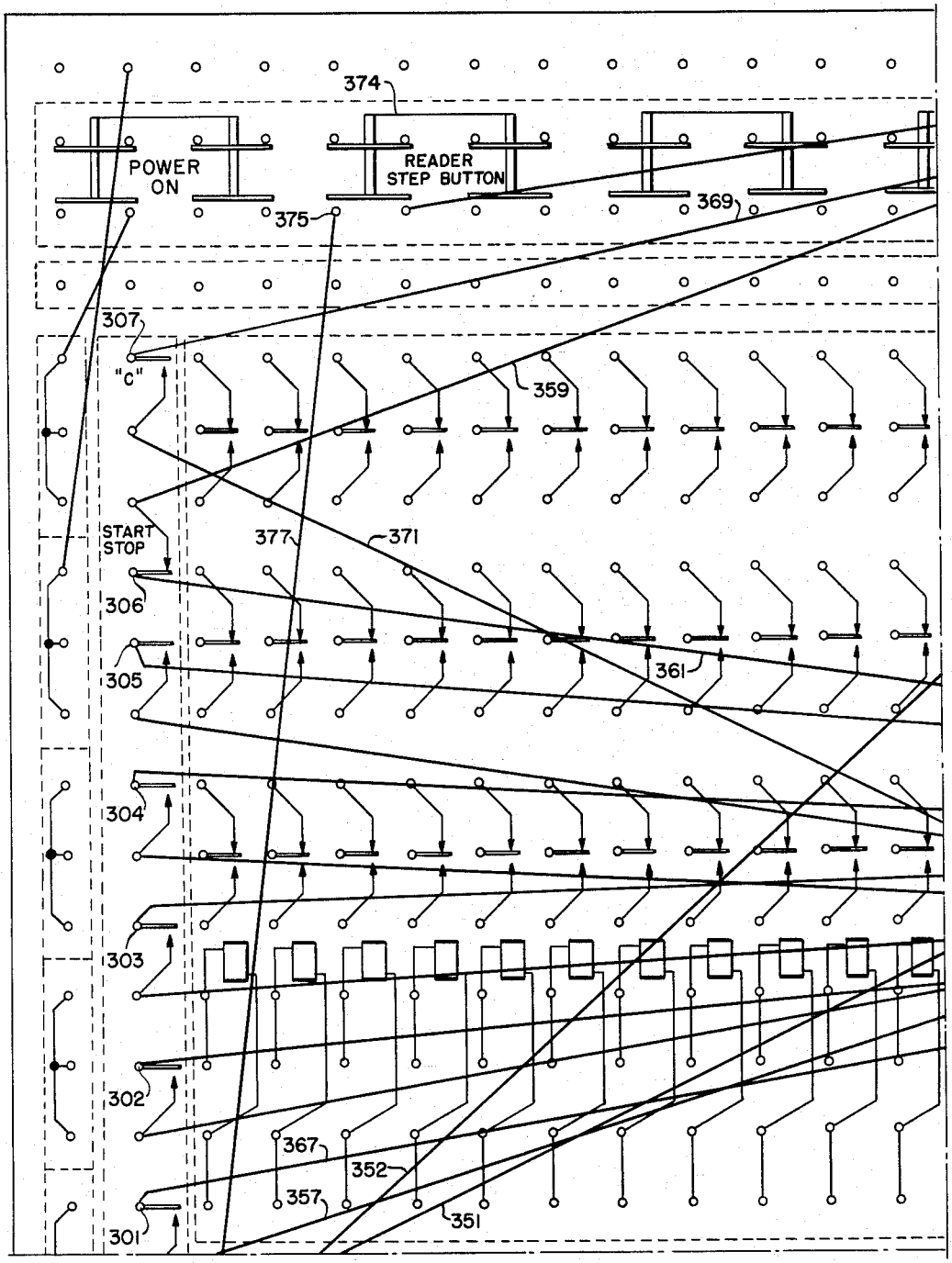
Figure 13:
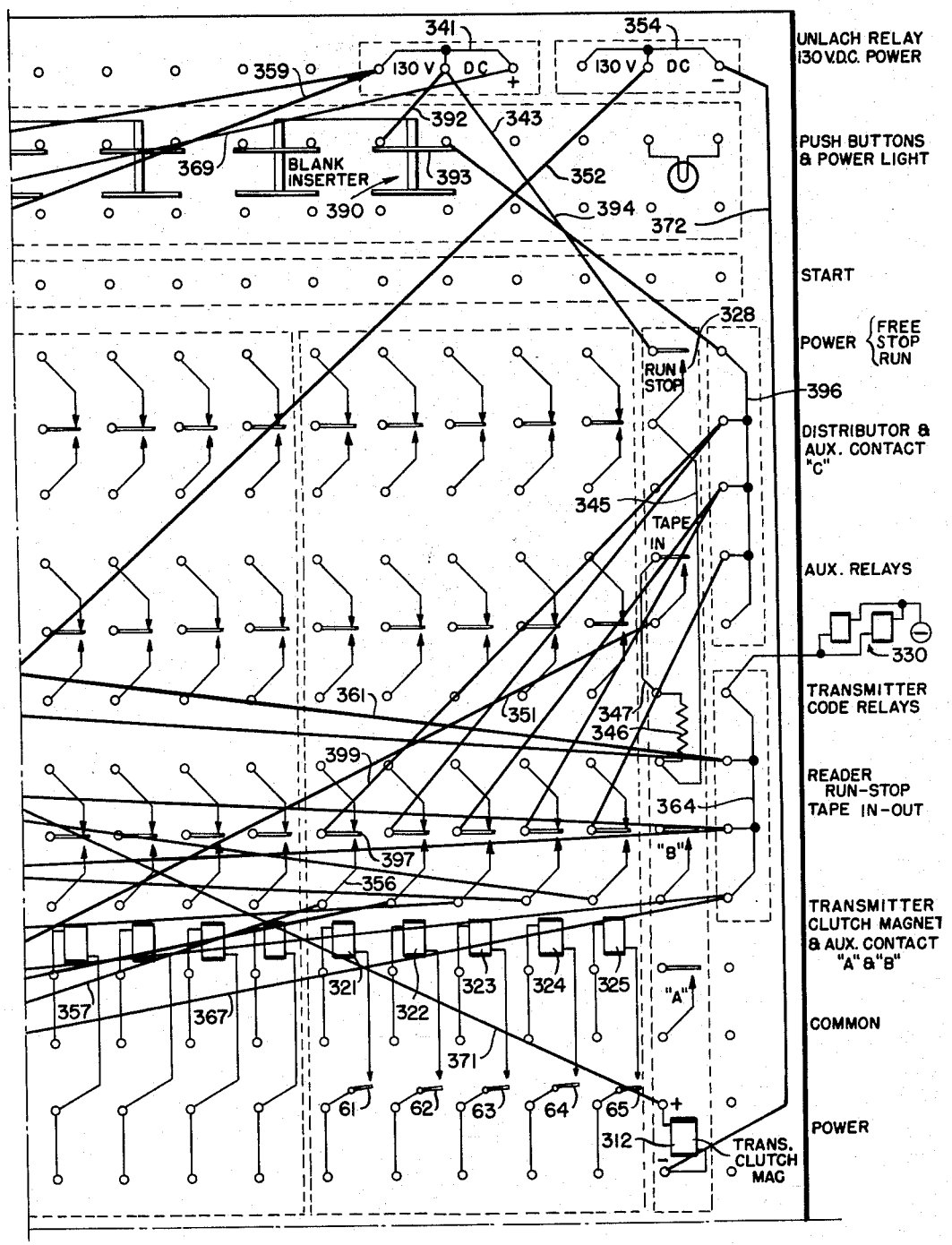
Figure 14:
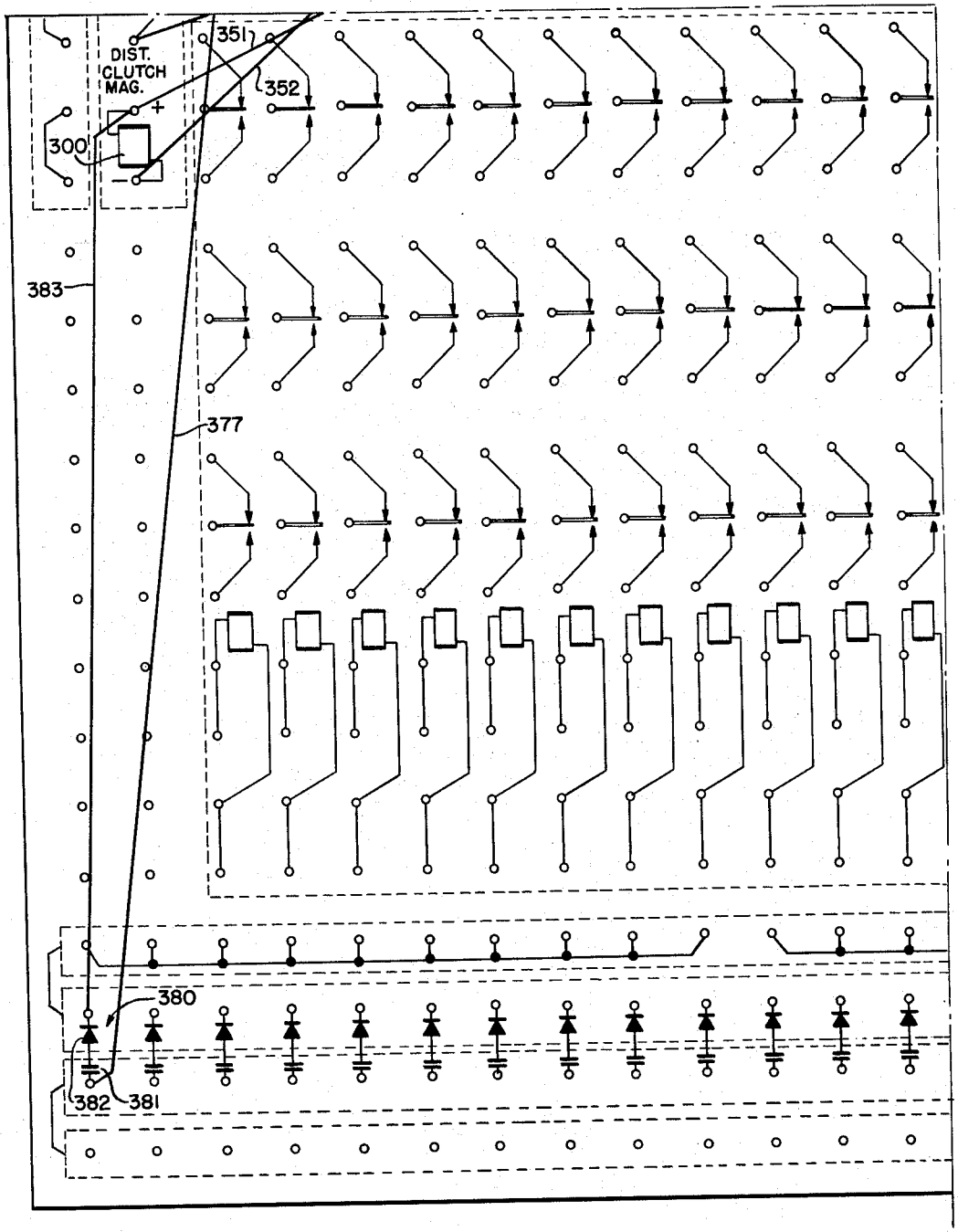
Figure 15:
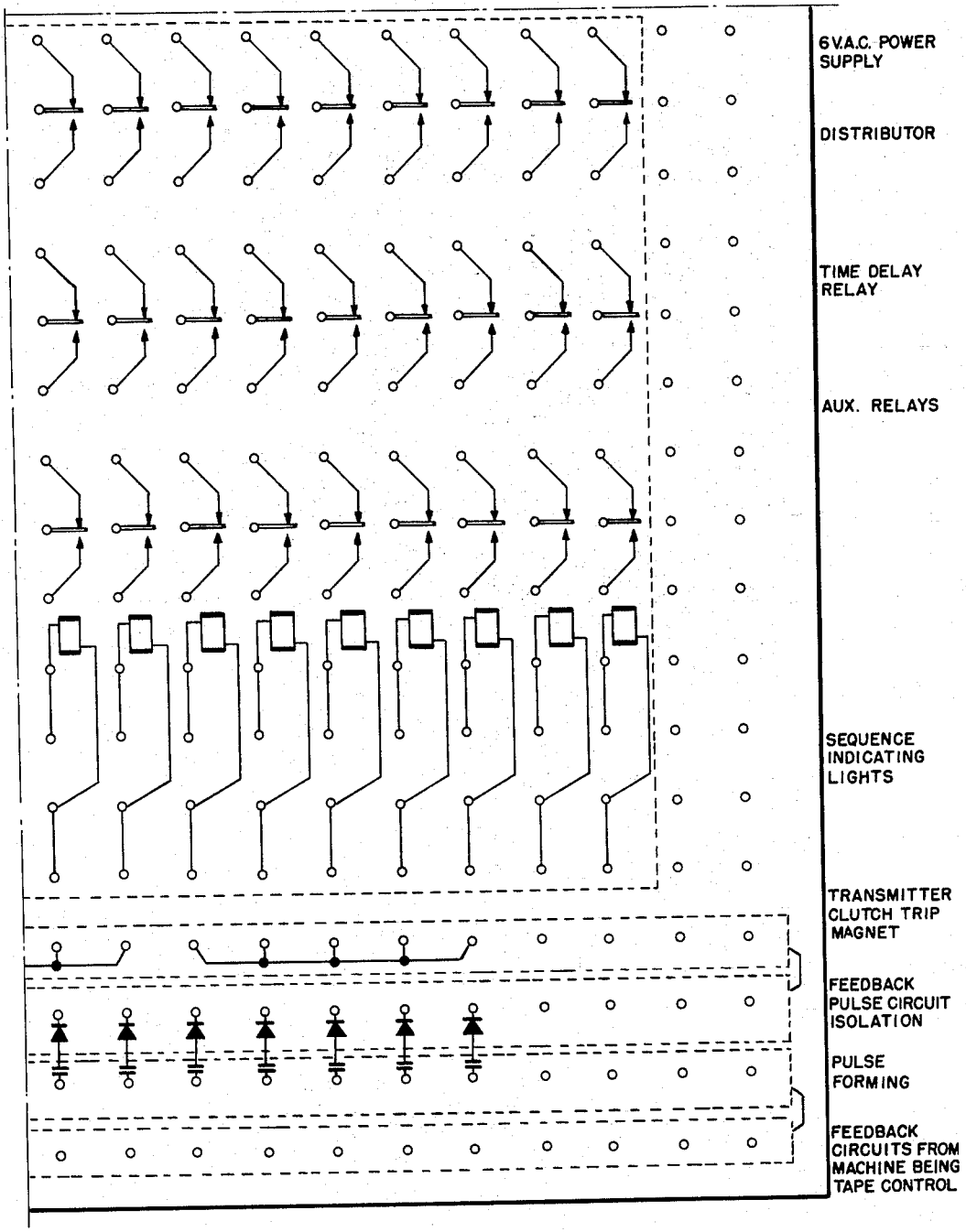

FIGS. 3, 4 and 5, when assembled as shown in FIG. 11, illustrate schematically the automatic machine control system for controlling and driving the work table in accordance with predetermined table movements;

FIG. 6 is a detailed view of the relays and contacts comprising the 5-to-32 converter shown in block diagram shown in FIG. 1;

FIG. 7 is a detailed view of a portion of a strip of tape having work table movements programmed therein in the form of permutative perforations;

FIG. 8 is a tracing of the path of the movement of the work table in accordance with work table movements described infra by way of example;

FIG. 9 is a schematic representation of a control circuit, integral with the circuit of FIGS. 3, 4 and 5, for automatically moving a spindle containing a machine tool into engagement with a work piece clamped to the work table;

FIG. 10 is an illustration of a plug board for interconnecting the automation system so as to control the movements of a work table and for interconnecting the automation system so as to reproduce the automation information contained in the storage medium;

FIG. 11 is a view showing the manner of assembly of FIGS. 3, 4 and 5, and

FIGS. 12 to 15, inclusive, when assembled as shown in FIG. 16, illustrate schematically certain terminal connections in the plug board shown in FIG. 10.

General description

Referring now to the drawings and in particular to FIG. 1, there is shown an illustration of a typical application of the present invention wherein the present automatic machine control system, comprised of a tape reader 15, a 5-to-32 converter 16 and a control circuit 18, is utilized to control the work table movements of a machine tool 20. The machine tool 20 is shown merely by way of illustration as being one of the many well-known machine tools to be found in the machine tool art with which the present invention has utility. The machine tool 20 is provided with a chuck 22 adapted to secure a work tool, for example, a milling tool, drill bit or router, for rotation. The machine tool 20 is further provided with a base 24 to which is secured by clamps (not shown) a work table 30 capable of X and Y movement with respect to a work tool secured in the chuck 22.

The work table 30 is provided with X and Y axis motors 32 and 34, respectively. The X axis motor, upon being energized, moves the work table in the plus or minus X direction with respect to a work tool secured in the machine tool 20 and, similarly, the Y axis motor, upon being energized, moves the work table in the plus or minus Y direction, in the manner well-known in the art. It will be understood that the work table 30 shown is merely illustrative of any motor driven work table capable of moving a work piece secured thereto along a path with respect to the X and Y axes, and it will be further understood that the present invention has utility with any such work table, such as for example, the work table disclosed in the Patent No. 2,838,967, granted June 17, 1958, to Arthur A. Meyer, or Patent No. 2,782,348, granted March 19, 1957, to Hans P. Luhn.

As may best be seen in FIG. 2, each axis motor is provided with a drive shaft or screw 33 on the end of which is mounted a double brush commutator wiper 38. The wiper 38 rotates with the drive screw 33 and with respect to an X axis commutator 39. It will be understood that the Y axis motor is similarly equipped with a Y axis drive screw 46 and a Y axis commutator 49 (FIG. 5). It will be further understood that the X and Y axis motors are capable of independent operation, for plus or minus X or plus or minus Y movement, respectively, or are capable of simultaneous energization for resultant or angular movement with respect to the X and Y axes. The axis motors shown in the specific embodiment are synchronous motors capable of rotation in either the clockwise or counterclockwise direction and may be any one of the many well-known and commercially available synchronous motors to be found in the prior art. The motors move the work table 30 with respect to the X and Y axes in accordance with a series of predetermined table movements embodied in a storage medium such as the tape 52.

The tape reader 15 of the automatic machine control system may be of any type capable of reading or sensing vertical rows of permutatively formed perforations, representative of characters and capable of presenting the sensed characters as permutative parallel electrical impulses or signals, such as for example, the tape reader shown and described in Bulletin No. 242B published by the Teletype Corporation and bearing a copyright date of 1957 or the tape reader disclosed in United States Patent No. 2,296,845, granted September 29, 1942 to Mr. M. T. Goetz. In such tape readers, a clutch magnet 50, FIG. 1 (the magnet 72 of the cited patent), when energized will cause the tape 52 to be advanced one step and will sense the row of perforations presented to a plurality of tape sensing pins, such as shown in the patent granted to Mr. M. T. Goetz. The tape 52, as may be seen in more detail in FIG. 7, contains vertical rows of perforations, 5 levels, formed in accordance with the well known 5-unit Baudot code; the rows of perforations are representative of characters, figures or letters, as represented in the Baudot code. The sensing pins, shown in the aforementioned patent to Mr. M. T. Goetz, will sense the rows of perforations in a step-by-step manner, under the control of the clutch magnet 50, and will close the five sets of make contacts 61 through 65 in accordance with the rows of perforations formed in the tape 52. For example, in the Baudot code the letter D is represented by perforation being formed in the numbers 1 and 4 levels (FIG. 7), hence, upon the letter D being read by the tape reader sensing pins, make contacts 61 and 64 (FIG. 1) will be closed and battery 76 will be supplied over the conductors 71 and 74.

The 5-to-32 converter 16 is shown in detail in FIG. 6 and is adapted to receive the five permutative electrical impulses from the tape reader and to convert or translate the five permutative electrical impulses into any one of 32 outputs through the double fan of relay contacts associated with the relays 1 to 5. The number of outputs available follows from the fact that each level in the tape may either be perforated or imperforate and since there are a maximum of five levels, 32 or $2^5$ combinations are possible. More specifically, the conductors 71 through 74 from the tape reader are connected to the five converter relays, numbered 1 through 5, shown in the lower portion of FIG. 6.

Continuing with the letter D example, upon the letter D being sensed by the tape reader 15, current from battery 76 in the form of permutative electrical impulses is supplied over conductors 71 and 74 thereby energizing converter relays 1 and 4. Upon being energized, converter relays 1 and 4 complete a path from battery 76 over the armature 1 and front contact of converter relay 1, over conductor 77 over the armature 9 and back contact of converter relay 5, over conductor 78, the armature 5 and front contact of energized converter relay 4, over conductor 79, the armature 4 and back contact of converter relay 3, over conductor 81, the armature 4 and back contact of converter relay 2 and through the winding of relay D to ground. In similar manner, in response to the other 31 possible permutative combinations of electrical impulses from the tape reader, the 5-to-32 converter is capable of energizing 31 other relays associated with the other 31 outputs of the converter, for example, the tape reader 15 upon sensing the character J effects the energization of the J relay.

The control circuit 18, shown in FIG. 1, is comprised of the X and Y axis commutators 39 and 49, respectively, a plurality of relays energizable in response to the outputs of the 5-to-32 converter, and of additional control or operating relays.

To summarize briefly and generally, the work table movements are programmed in the tape 52 in the form of characters, to be referred to as a command code or group of control characters, as represented in the aforementioned Baudot code: the characters are sensed by the tape reader 15 which produces electrical impulses in accordance with the sensed characters, the electrical impulses are translated by the 5-to-32 converter 16 into control signals which energize relays of the control circuit 18, and the relays of the control circuit prepare various energization and control circuits for the X and Y axis motors which move the work table 30 in accordance with the work table movements programmed or formed in the tape 52.

The present automatic machine control system utilizes a novel and unique approach for controlling and moving the work table 30 for lengthy movements in contradistinction to an incremental movement, i.e., a movement requiring the axis motors, or motor, to rotate their respective drive shafts for less than a full revolution, namely, a lengthy movement wherein the X and Y axis motors, or either independently, rotate their respective drive shafts continuously in response to a single group of control characters for a predetermined number of revolutions so as to move the work table a predetermined distance in a predetermined direction without the motors, or motor, being stopped and restarted in response to another command code or group of control characters. The control circuit 18, as described above, is programmed to recognize characters in the command code and positions the work table accordingly, more specifically, the alphabetically designated relays are energized upon their associated characters being sensed by the tape reader 15 and control and energization circuits are established accordingly. The X and Y axis motors, 32 and 34, respectively, or either independently, are controlled in moving the work table 30 for lengthly movements by the placement of control characters in the tape 52 which the control circuit is not programmed to recognize, i.e., a control character for which there is no associated alphabetically designated relay. The motors, 32 and 34, or motor, depending upon the desired direction of travel, are started and begin rotating in directions determined by the recognizable control characters, but once being started the motors are maintained in operation by the tape reader 15 sensing or reading a sequence of characters which the control circuit 18 is not programmed to recognize. The motors, or motor, are then stopped, after a predetermined number of non-recognizable characters are sensed by the tape reader 15, in response to a recognizable character placed in the tape 52 after the predetermined number of non-recognizable characters.

The commutators, such as the one shown in FIG. 2, are also of a unique and novel construction. In order to provide incremental work table movements, i.e., movements for which the X and/or Y axis motors 32 and 34, respectively, are required to rotate for a fractional part of a complete revolution, control circuits, equal in number to the number of increments into which a full revolution is divided, must be establishable to stop or de-energize the axis motors upon the completion of the required fractional rotations. Furthermore, each control or de-energization circuit must include at least one control element, e.g., a relay consequently, the cost and complexity of an automatic machine control system increases in direct proportion as the number of incremental stops per revolution increases. Obviously, the cost and complexity of the system could be markedly decreased if one control element, relay as for example, could be utilized to control more than one incremental stop per revolution. Such double or multiple usage of a control element is made possible by the unique and novel construction of the commutators as shown in FIG. 2, and is accomplished by dividing the inner ring of the commutator into a number of sectors and associating each sector with a number or group of outer commutator segments, and further associating the segments in each group with the segments in every other group; such commutator construction being described in detail below.

The control circuit 18 of FIG. 1 is provided with a plug board 82, as illustrated in FIG. 10, which is capable of interconnecting the components of the control circuit 18 to either control the work table movements of a machine tool or to control a recorder to reproduce the automation data contained in the punched tape. The plug board 82 is comprised of a terminal board 84, having a plurality of pins 86 to which are connected, e.g., leads from the relays and armatures and contacts of the relays, and a mating or cross-connection board 87, having a plurality of apertures or sockets 89 adapted to receive the ends of straps or connecting wires 90 and adapted to mate in electrical engagement with the pins 86 and thereby establish electrical interconnections and circuits, as for example, the coupling of battery 91 through the pins 86 and strap 90 to the armature of the relay shown in FIG. 10. Utilization of the plug board 82 permits the components of the control circuit 18 to be used to control the movements of the work table 30 with one set of interconnections or straps on the cross-connection board 87 and, with another set of cross-connections, to be used to control a recorder, such as a reperforator or a teletypewriter, to reproduce the data stored in the tape 52.

*Detailed description*

The manner in which the automatic machine control system is operable to control the movements of the work table 30 will now be set forth in detail.

FIGS. 3, 4 and 5, when assembled as shown in FIG. 11 illustrate the control circuit 18 of FIG. 1, when the straps or interconnecting wires 90, FIG. 10 have the components of the control circuit 18 interconnected to control the movements of the work table 30 in response to the data contained in the tape 52 of FIG. 1. The control circuit includes a plurality of alphabetically designated relays, A to N, inclusive, which are energized upon the associated letter or character, as represented in the Baudot code, being sensed by the tape reader 15; the foregoing example will be recalled of the manner in which the relay D, shown in FIGS. 1 and 6 and now the identically designated relay being shown in FIG. 3, was energized in response to the character D being sensed or read by the tape reader 15 of FIG. 1. Hence, it will be understood that the windings of the alphabetically designated relays which terminate in the small circles of FIGS. 3, 4 and 5 are electrically interconnected with the identically, alphabetically designated contacts of the converter relays 1 through 5 of FIG. 6, which also terminate in the small circles, e.g., the small circle associated with relay D in FIG. 3 and identified by reference numeral 99 in the same small circle identically identified in FIG. 6. The control circuit is also comprised of a plurality of control relays 100, 101, 103, 105, 107, 109 and 111, which control relays are energized upon the completion of their respective energization paths being established by the closures of the normally open contacts of the alphabetically designated relays. Further, the control circuit includes the X axis and Y axis commutators 39 and 49, respectively, which are comprised of inner sectors designated I and J, a plurality of outer segments designated 1 to 10, inclusive, and the CW (clockwise) and CCW (counterclockwise) segments.

Relay A is energized for counterclockwise rotation of the X axis motor resulting in the work table 30, FIG. 1, being moved in the plus X direction; relay B is energized to energize the X or Y axis motors; relay C or off relay, control relay 100 and the timer TM control the locking circuits of the other relays and are operative to break or interrupt the locking circuits of the other relays at the end of a predetermined period of time set on the timer TM; relays D through H are associated with the segments of the X axis and Y axis commutators 39 and 49, respectively, each relay is associated with two commutator segments, e.g., relay D is associated with segments 1 or 6, relay E is associated with segments 2 or 7, etc.; relay I is associated with commutator segments 1 to 5, inclusive, and relay J is associated with commutator segments 6 to 10, inclusive; relay K is energized for simultaneous energization or rotation of the X and Y axis motors 32 and 34, respectively; relay L is energized for counterclockwise rotation of the Y axis motor 34 for movement of the work table 30 in the minus Y direction; relay M is energized for energization only of the Y axis motor, the circuit's normal condition being effective to provide energization only of the X axis motor; relay N is energized to provide multi-revolution operation of the axis motors, i.e., a plurality of complete revolutions of the motor shafts or drive screws; control relays 101, 103 and 105 are energized upon relay M being energized to transfer control of the circuit from the X axis commutator to the Y axis commutator, the segment relays D through H being associated with the segments of the X axis commutator through the armatures, of the control relays 101, 103 and 105, normally being in engagement with their back contacts, and being associated with the segments of the Y axis commutator upon energization of the control relays 101, 103 and 105 and the armatures of the control relays being moved into engagement with their front contacts; relay 107 is energized for counterclockwise rotation of the Y axis motor 34; relay 109 is energized for X or Y counterclockwise rotation; and control or stepping relay 111, upon being energized, is effective to pulse the clutch magnet 50, FIG. 1, more specifically, upon relay 111 being energized, battery 113 is transferred by armature 1 to its front contact P which, it will be understood is interconnected with conductor 58, FIG. 1. It will be further understood that each contact designated P of each relay is so interconnected with the clutch magnet 50 of the tape reader 15 and that the current from the battery, such as 113, passes through a pulse shaping circuit (shown and described infra) such that the pulse is of sufficient magnitude and duration to energize the clutch magnet and step the tape 52 in the tape reader 15 to cause the sensing pins of the tape reader to read or sense the next character in the tape.

The X axis commutator 39 and Y axis commutator 49, as alluded to in the general description, are of novel and unique construction and permit the double or multiple usage of the commutator segment relays D through H. More explicitly, in the present specific embodiment, each revolution of an axis motor, e.g., the X axis motor 32, moves the work table 30 a distance of 0.10 inch, thus if it is desired to provide increment work table movements of 0.01 of an inch, each revolution or commutator outer ring must be divided into ten (10) increments or segments. Since circuits must be provided to stop or de-energize the axis motors each tenth of a revolution or at each commutator segment, a control element, such as a relay, must be associated with each increment or segment, plus, a control element or relay, must be associated with the inner commutator ring, hence, a division of a commutator into 10 outer segments would require a maximum of 11 relays, 10 for the segments and one for the inner ring. However, by dividing the inner commutator ring into a plurality of sectors, associating a group of segments with each sector, and further associating the segments in each group with the segments in every other group, a substantial reduction in the number of control elements or relays can be achieved.

The minimum number of inner sectors and outer segments is determined by a mathematical examination of the factors, and the sum of the factors of the desired number of increments per single revolution of an axis motor. In the instant embodiment, it was determined that the work table 30 should be positionable at 0.01 inch increments, and since each revolution of an axis motor moved the work table a distance of 0.10 inch, the commutator outer rings are divided into ten segments. Hence, the desired number of increments is ten and the two sets of factors of the number 10 are 1 and 10, 2 and 5. The minimum number of control elements or relays is found to be equal in number to the sum of the smaller or smallest factors of the number of increments or electrical connections desired, hence, the larger factors of the number 10 are 1 and 10 and their sum is 11; the smaller factors of the number 10 are 2 and 5 and their sum is 7, accordingly, a minimum of 7 control elements or relays will accomplish the desired 10 incremental movements per revolution of an axis motor. It has been further found that the inner sectors should be equal in number to the smaller number of the two smallest factors, 2 in the instant example, and that the outer segments should be equal in number to the larger number of the two smallest factors, 5 in the instant example.

Should it be determined that each revolution of the commutator should be divided into 100 divisions, there should be 10 inner sectors and 10 outer segments as the smallest factors of 100 are 10 and 10, i.e., their sum is the smallest, viz., 20.

Since each revolution is to be divided into 10 divisions, the commutators, X and Y, are comprised of two inner sectors, I and J, and of 5 outer segments. It will be noted that physically there are 10 outer segments, a group of 5 segments being associated with each inner sector, but, it will be further noted that actually or electrically there are only 5 outer segments, 1 and 6 of the X axis commutator are electrically interconnected by conductor 121, segments 2 and 7 are electrically interconnected by conductor 123, and the remaining segments in each group are similarly interconnected. Thus only 7 control elements or relays can be employed to provide 10 increments or steps per revolution, i.e., the commutators can establish 10 electrical connections or de-energizations of the axis motors per revolution. The five segment control relays D through H, FIGS. 3, 4 and 5, are associated with the outer segments, viz., relay D is normally associated with segments 1 and 6 of the X axis commutator, the armature 2 of relay D is connected to the numbers 1 and 6 segments of the X axis commutators by conductor 125, armature 3 and back contact of control relay 101 and conductor 127. Similarly, the remaining control relays are normally associated with the commutator segments of the X axis commutator, furthermore, energization of the control relays 101, 103 and 105 transfers the commutator segment relays D through H to the segments of the Y axis commutator. Since, as stated above, all the locking paths or circuits for the energized relays, including in particular the relays which establish energization circuits for the axis motors, are coupled through the combination of the C or off relay, control relay 100 and timer TM, and since energization of each segment control relay, D through H, prepares an energization path for the C or off relay, which when energized interrupts all previously established energization paths including the ones for the axis motors 32 and 34, the D relay, for example, upon being energized and upon the X axis double brush wiper 38 spanning the J sector, for example, onto which battery would be standing in response to the J relay having been previously energized, the battery standing on the J sector would be transferred over the previously described prepared energization circuit for the C or off relay and the C relay would be energized and the energization path for the axis motors 32 and 34 would be broken or interrupted. Thus, assuming the X axis commutator had been at segment 10 or 0 when the energization path for the X axis motor 32 was established, the motor energization path would be broken when the X axis commutator spanned the J sector and number 1 segment and hence, the X axis drive screw 36 would have moved the work table 30 a distance of 0.01 inch in the negative X direction. Had the I relay been previously energized, instead of the J relay, and had battery been standing on the I sector, rather than the J sector, the work table 30 would have been moved 0.070 of an inch since the energization path of the X axis motor would not have been broken or interrupted until the X axis commutator had traversed 7 commutator segments.

As aforesaid, energization of the control relays 101, 103 and 105 transfers control of the circuit to the Y axis commutator 49, i.e., couples the commutator segments relays D through H to the Y axis commutator segments and couples the I and J sector relays to the I and J commutator segments. Thus the work table can be moved incrementally in the plus and minus Y directions. When a resultant movement of the work table is desired, the X axis commutator controls the system as in a movement of the table only in the X directions and the angular distance is measured as determined in relation to the X axis displacement.

*Table movements*

To facilitate an even more explicit understanding of the automatic machine control system, the work table movements and the electrical circuits and connections necessary to move the work table 30 along the path shown in FIG. 8 will now be described in detail.

To cause the work table 30 to move from point 131 to point 132, a movement of 1.00 inch in the positive Y direction, the characters or code letters in NMJB (10 blanks) C will be perforated into the tape as shown in FIG. 7.

Upon the letter N being read by the reader, the N relay is energized and upon energization, prepares an energization path for the stepping relay 111 from ground, through the winding of the stepping relay, over conductor 151 through the armature 2 and back contact of energized relay N, over conductor 153 through the armature 1 and back contact of control relay 109, over conductor 155, armature 1 and back contact of control relay 103, and over conductor 156 to the clockwise CW segments of the X axis commutator 39. Also upon energization, relay N locks up through its armature 3 and front contact, conductor 157, conductor 158, armature 1 and back contact of control relay 100, conductor 159 and conductors 159 and 161 to battery 130; and sends a stepping pulse to the clutch magnet 50 of the tape reader 15 over armature 1 and front contact P and conductor 58, shown in FIG. 1. The tape reader 15 when stepped, next reads the letter M and effects the energization of the M relay which upon being energized effects the energization of control relays 101, 103 and 105, thereby transferring all movement controls to the Y axis commutator, by establishing an energization path from ground 120 over conductor 163, through the windings of the control relays 101, 103 and 105, over conductor 164, through the front contact and armature 3 of energized relay M, over conductor 166 and conductor 158, armature 1 and back contact of control relay 100, conductor 159, and conductor 161 to battery 130, and sends a stepping pulse over armature 2 and front contact to the clutch magnet 50 of the tape reader 15. Upon being stepped in response to the stepping pulse, the tape reader 15 next reads or senses the letter J and effects the energization of the J relay which transfers battery, from source 130, over conductor 168, armature 2 and front contact of energized relay J, over conductor 170, armature 2 and front contact of energized control relay 105, over conductor 171 to the J sector of the Y axis commutator 49. Also energization of relay J is effective to complete a locking circuit from ground 140, through the winding of relay J, through armature 3 and front contact of relay J, over conductor 173, conductor 158, armature 1 and back contact of control relay 100, conductor 159 and conductor 161 to battery 130, and to send a stepping pulse back to the clutch magnet 50 of the tape relay from battery 142, armature 1 and back contact of relay I, conductor 174, armature 1 and front contact of energized relay J and over conductor 175. The tape reader next reads the letter B which effects energization of the B relay which completes an energization path from battery 130, over conductor 161, armature 2 and back contact of relay C, over conductor 176, armature 1 and front contact of energized relay B, over conductor 177, over armature 1 and front contact of energized relay M, conductor 178, armature 1 and back contact of relay L, and conductor 179 to the No. 1 connection of the Y axis motor 34. Also upon energization, relay B sends a stepping pulse from battery 143 to the clutch magnet 50 of the tape reader through its armature 2 and front contact, and locks up from ground 140, over conductor 181, through the winding of relay B, armature 3 and front contact, conductor 183, conductor 158, armature 1 and back contact of control relay 100, conductor 159, and conductor 161 to battery 130. Upon the energization of relay B and the coupling of battery to the No. 1 motor connection of the Y axis motor and since the No. 2 motor connection is coupled to ground over conductor 144, the Y axis motor begins to turn rotating the Y axis drive screw 46 and carrying the Y axis double brush wiper 48 in a clockwise direction with the double brushes spanning the inner commutator sectors and the outer commutator segments. It will be recalled that energization of the J relay transferred battery to the J sector, hence, as the Y axis wiper brushes span the J sector and the clockwise (CW) segments, battery is transferred to the clockwise segment, over conductor 185 over the armature 1 and front contact of energized control relay 103, over conductor 155, the armature 1 and back contact of control relay 109, conductor 153, armature 2 and front contact of energized relay N, conductor 151 and winding of stepping relay 111 to ground, thereby effecting energization of the stepping relay 111. Upon being energized the stepping relay 111 sends a stepping pulse from battery 113, over its armature 1 and front contact, conductor 58 (FIG. 1), to the clutch magnet 50 of the tape reader 15. The tape reader moves the tape one step and reads a blank, a no information character or a character which the control system is not programed to recognize, i.e., no relay is energized or electrical connection established in response to the sensing of the blank character, of course it will be understood that any other character which the circuit is not programed to recognize could be used as well as the character blank. Thus the energization path of the Y axis motor remains completed, the motor continues to rotate in the clockwise direction and each time the Y axis wiper 48 and double brushes span the J sector and the clockwise segment the immediately, previously described, energization path for the stepping relay 111 is again completed and the reader will be stepped and will read or sense another blank character. Since ten blanks have been programed into the tape, the reader will be stepped ten times or once for each revolution of the Y axis motor, and, since each revolution of the motor moves the work table 30 0.10 of an inch, the work table will be moved 1.00 inch in the positive Y direction, or 1.00 inch in the negative Y direction with respect to a drill secured in the machine tool chuck 22. After ten blank characters have been stepped through the reader, the reader will sense the character C which will effect the energization of the C or off relay which transfers battery 130 over conductor 161, armature 2 and front contact of energized relay C, over conductor 188, and through the winding of control relay 100 to ground. Energization of control relay 100 moves its armature 1 out of engagement of its back contact thereby breaking or interrupting all the locking energization circuits for the previously energized relays and in particular breaking the energization path for the Y axis motor, thereby stopping the movement of the work table 30, completes an energization path for the motor of the timer TM from ground 146, over conductor 189, the armature 1 and front contact of energized control relay 100, conductor 159 and conductor 161 to battery 130 thereby causing the timer motor to run for a period of time determined by the setting of the timer TM. Such period of time causes the work table 32 to remain stationary, not permitting the C relay to be de-energized to step the tape reader 15 to the next character, to permit a machine operator to manually move a tool, drill bit for example, into engagement with a work piece clamped to the work table and drill a hole in the work piece at point 132. Upon the timer TM having timed out a predetermined period of time, the timer moves its armature 148 out of engagement with its back contact and thereby interrupts the locking circuit for relay C which was established upon energization of relay C from ground 140, conductor 181, the winding of relay C, armature 3 and front contact of energized relay C, conductor 149, armature 148 and back contact of timer TM and conductors 159 and 161 to battery 130. De-energization of relay C sends a stepping pulse from battery 147 and armature 1 and back contact, of now de-energized relay C, to the clutch magnet of tape reader 15 and cause the reader to sense the next character programed in the tape 52.

For the balance of the table movements, no mention will be made of the relay locking circuits or the stepping pulses being sent back to the clutch magnet 50 of the tape reader as such are identical with the above-described circuit operations.

The movement of the table from point 132 to point 133, a movement of 1.400 inches in the positive X direction, will now be set forth. The table movement is embodied in the characters NJB (14 blanks) C, which code or group of characters are programed or placed in the tape 52. It will be understood that the table motors are idle and that the tape reader is reading the letter N of the second group of control characters. It will be noted that the second group of control characters are identical to the first group of control characters with the exception that the letter M is not included. Since the M relay, it will be recalled, merely transfers control of the work table 30 to the Y axis commutator, the letter M is not included in the second group of control characters as the second group merely causes the work table to move in the X direction. Hence the NJ and B relays, and attendant control circuit operations, will occur as described above, except that the X axis motor 32 and commutator 39 will be operating and causing the table to be moved a distance of 1.400 inches in the positive X direction as there are 14 blanks following the character B. When the tape reader reads the letter C, the control circuit will be returned, as before to its normal condition and the work table will have moved from point 132 to point 133.

The third table movement will now be described which is a movement of 0.030 of an inch in the positive X direction. This movement is presented to illustrate an incremental movement of the work table 30 which requires the X axis motor to rotate for less than one complete revolution. The third group of control characters is IBF and will result in the table being moved between points 133 and 134 on FIG. 8. The tape reader 15 will first read the letter I and effect energization of the I relay which transfers battery 130 over conductors 168 and 169, armature 2 and front contact of energized relay I, over conductor 191, armature 3 and back contact of control relay 105, and conductor 192 to the I sector of the X axis commutator 39. The tape reader next reads the letter B and effects energization of the B relay which transfers battery 130 over conductor 161, armature 2 and back contact of relay C, conductor 176, armature 1 and front contact of energized relay B, conductor 177, through armature 1 and back contact of relay M, conductor 193, armature 1 and back contact of relay A, and conductor 194 to the No. 1 motor connection of X axis motor 32, thereby completing an energization path for the motor through motor connection 1 and motor connection 2 which is returned to negative battery over the conductor 167. Also energization of the B relay, in the manner described supra, sends a stepping pulse back to the tape reader thereby causing the reader to read the character F. The stepping speed of the tape reader is such that the next succeeding character is sensed by the reader and its circuit operation accomplished before the axis motors can carry their associated wipers past the next adjacent commutator segments. The tape reader 15 upon sensing the character F, effects the energization of the F relay which prepares an energization path for the C or off relay from ground 140, over conductor 181, through the winding of the C relay, over conductor 195, conductor 196, armature 2 and front contact of energized relay F, conductor 197, armature 1 and front contact of control relay 101, and conductor 198 to the No. 3 commutator segment of the X axis commutator 39. When the character B was read and the clockwise energization path for the X axis motor completed, the drive shaft 36 of the X axis motor 32 began to rotate carrying the commutator wiper 38 in a clockwise direction and, upon the commutator wiper 38 spanning the commutator sector I and the No. 3 commutator segment, the battery, from source 130, standing on the sector I was transferred to the previously described energization path prepared for the C or off relay. Upon energization of the C or off relay, the control circuit, as described supra, is returned to the normal condition. The X axis commutator only rotated clockwise from the 10 or 0 commutator segment to the No. 3 commutator segment and, since the rotation between adjacent commutator segments results in the linear movement of the work table 0.010 of an inch, the table moved linearly 0.030 of an inch in the positive X direction and the table is now at point 134.

The next movement to be described will be the movement of the work table 32 from point 134 to point 135, a movement of 0.070 of an inch along the X axis but at an angle of 45° in the positive X and Y directions. The command code or group of characters for this movement are JKH. The tape reader will first read the letter J and as described above, will effect the energization of the J relay and cause battery to be transferred to the J sector of the X axis commutator 39. Upon being stepped, the tape reader senses the next character K and effects the energization of the K relay. Since battery is standing on armatures 1 and 2 of the K relay (battery being coupled thereto from battery 130 over conductor 161, armature 2 and back contact of relay C, conductor 176, and conductor 201) energization of relay K transfers the battery standing on its armature 1 to its front contact over conductor 203 and through the winding of the B relay to ground 140 over conductor 181 thereby energizing relay B, which, as in the last two previous work table movements, is effective to transfer battery to the No. 1 motor connection of the X axis motor. Also, energization of the K relay is effective to transfer battery from its No. 2 armature and front contact over conductor 205, through armature 1 and back contact or relay L, and over conductor 179 to the No. 1 motor connection of the Y axis motor 34. The tape reader when stepped next reads the character H and effects the energization of the H relay which prepares an energization path for the C or off relay from ground 140 over conductor 181 through the winding of the C relay, conductor 195, conductor 207, armature 2 and front contact of energized relay H, conductor 209, armature 2 and back contact of control relay 103 and conductor 211 to the No. 10 segment commutator of the X axis commutator 39. Each axis motor begins to rotate in the clockwise direction, due to the motor energization paths established upon the energization of the K relay, and will result in the work table 30 being moved at an angle of 45° with respect to the positive X and Y axes. It will be recalled that the X axis commutator wiper, at the conclusion of the last described work table movement, was stopped on the No. 3 axis commutator segment, hence upon clockwise rotation of the X axis drive shaft 36, the X axis commutator begins to move clockwise from the No. 3 commutator segment and as the X axis motor continues to rotate, the X axis wiper will be moved in the clockwise direction until the X axis commutator wiper spans the J sector and the No. 10 commutator segment at which time the battery standing on the J sector will be transferred to the No. 10 commutator segment and the previously described, prepared energization path for the C or off relay will be completed thereby energizing the C relay and causing the control circuit to be returned to its original condition. Briefly, in summary, both the X and Y axis motors rotated clockwise during the time that the X axis motor rotated the X axis commutator wiper 38 from the No. 3 commutator segment to the No. 10 commutator segment, hence, the table was moved at an angle of 45° in the positive X and Y directions for a distance of 0.070 of an inch along the X axis as the X axis commutator traversed seven commutator segments. The work table 30 has now moved to point 134 to point 135 and, upon energization of the C or off relay, a stepping pulse, in the usual manner, was sent back to the tape reader 15 to advance the reader to read the first character of the fifth and last group of control characters.

The last table movement to be described is a movement of 2.100 inches along the X axis but downward at an angle of 45°; the control characters for this movement are NLJK (21 blanks) C. Upon reading the letter N, the tape reader 15 effects the energization of the N relay which prepares an energization path for the stepping relay 111, from ground 120 through the winding of the relay 111, over conductor 151, armature 2 and front contact of energized relay N, conductor 153, armature 1 and back contact of control relay 109, conductor 155, armature 1 and back contact of control relay 103, and conductor 156 to the clockwise segment associated with the I sector of the X axis commutator 39. The tape reader 15 next reads the letter L and, in the usual manner, effects the energization of the L relay which, upon being energized, prepares an energization path from the front contact of the No. 2 armature of the K relay, over conductor 205, armature 1 and front contact of now energized relay L and over conductor 215 to the No. 3 motor connection of the Y axis motor 34. Upon being stepped, the tape reader 15 next senses the letter J and effects the energization of the J relay, which when energized, transfers battery 130 over the conductor 168, through armature 2 and front contact of energized relay J, conductor 170, armature 2 and back contact of control relay 105, and over conductor 175 to the J commutator sector of the X axis commutator 39. The tape reader next senses the letter K and effects the energization of the K relay. It will be recalled and as previously described, that the armature numbers 1 and 2 of the K relay have battery standing thereon, hence, upon the energization of the K relay, battery is transferred from the No. 2 armature of the K relay over the previously described energization path prepared in the No. 3 motor connection of the Y axis motor which causes the Y axis motor to rotate in the counterclockwise direction, and energization of the K relay transfers the battery standing on the No. 1 armature to its front contact over conductor 203, and through the winding of relay B and over conductor 181 to ground 140 thereby energizing relay B. Upon being energized, relay B transfers battery 130 over conductor 161, armature 2 and back contact of relay C, conductor 176, armature 1 and front contact of now energized relay B, conductor 177, armature 1 and back contact of relay M, conductor 193, armature 1 and back contact of relay A, and over conductor 194 to the No. 1 motor connection of the X axis motor 32. Upon the establishment of the previously described energization paths for the X and Y axis motors, the X axis motor rotates in the clockwise direction and the Y axis motor rotates in the counterclockwise direction. It will be recalled that upon the energization of the N relay, an energization path was prepared for the stepping relay 111 to the clockwise (CW) segment associated with the J sector of the X axis commutator 39, hence, each time the X axis commutator wiper spans the J commutator sector and the clockwise commutation segment, the stepping relay 111 is energized and a stepping pulse sent back to step the tape reader 15 one step. Since there are 21 blanks placed into the tape, the stepping relay 111 will be energized 21 times and the work table 30 will be moved 21 tenths of an inch along the X axis but downward at an angle of 45°. Following the reading of the 21st blank, the tape reader will sense the letter C and effect the energization of the C or off relay which is effective, in the aforesaid manner, to interrupt the locking circuits of all energized relays and to stop the axis motors and restore the control circuit to its original condition. Hence the tape has now moved from point 135 to point 136 and the control circuit is again in its normal condition.

It will be understood that the present control system is capable of moving the work table 30 along a regular or irregular circular path. Since each point on a curved surface is locatable with respect to X and Y axes, the automation data programmed in the tape 52 can move the work table 30 in smooth or irregular circular paths merely by the correct choices of successive X and Y movements.

*Spindle control circuit*

In addition to positioning the work table 32 with respect to a tool, e.g., a drill bit, secured in the chuck 22 of the tool 20, the present automatic machine control system is capable of moving the tool automatically into engagement with a work piece clamped to the work table 32 and in timed relation with the movement of the work table. A specific embodiment of the additional control circuitry for accomplishing this additional feature is shown in FIG. 9 and includes: relays O and P, operable in the same manner as the previously described alphabetically designated relays; an air valve solenoid 251; and the pneumatically operable spindle 254.

The spindle 254 can be any of several commercially available spindles capable of being integrated with an automation process, one such spindle is a pneumatically operable spindle which includes a motor 255 and a vertically reciprocable shaft 257 positioned within an air cylinder (not shown). Upon energization of the air valve solenoid 251, air is forced into the upper part of the cylinder and the shaft 257, having a drill bit secured in its lower extremity and being rotated by the motor 255, is moved downwardly into engagement with a work piece secured to the work table 32. When the shaft reaches the end of its presettable length of downward travel, the shaft is operable to move the armature 259 into engagement with its front contact and complete a circuit, described infra, which is effective to release or de-energize the air valve solenoid 251 and return the shaft 257 to its upward direction. Release of the air valve solenoid 251 either causes air to be forced into the lower half of the air cylinder to return the shaft to its upward position or allows the air in the cylinder to escape or exit and permits a compression spring to return the shaft to its upward position; both types of return being well known in the art. When the shaft 257 reaches the end of its upward travel, the shaft moves armature 260 into engagement with its front contact and completes another circuit, also described infra, which effects another operation.

It will now be assumed that it is desired to move a work piece from point 131 to point 132, FIG. 8, and to drill a hole in the work piece at point 132. The code control characters for such an operation are NMJB (10 blanks) POC. Characters NMJB (10 blanks) are effective, in the manner described above, to move the work piece from point 131 to point 132. When the character P is read by the tape reader, relay P is energized: armature 1 moves into engagement with its front contact and completes an energization path for the air valve solenoid 251 from negative battery 261, over conductor 263, through the winding of solenoid 251, over conductor 265, armature 1 and front contact of energized relay P, and over conductors 267 and 271 to positive battery 269; and moves armature 2 into engagement with its front contact and completes a locking circuit from ground through the winding of relay P, conductor 270, the armature 1 and back contact of relay O and conductor 271 to positive battery 269. The air valve solenoid 251, upon being energized, causes the shaft 257 to be moved downward and a drill bit, secured in the shaft, to be moved into engagement with the work piece to drill a hole at point 132, FIG. 8. When the hole has been drilled and the shaft 257 has reached the end of its downward travel, the shaft moves armature 259 into engagement with its front contact thereby coupling positive battery 272 over conductor 273 and conductor 275 to the clutch magnet 50 of the tape reader. The tape 52 is stepped in the reader and the next character O is read and the O relay is energized. Energization of the O relay moves its armature 1 out of engagement with its back contact and thereby breaks or interrupts the previously described locking circuit for the P relay. The P relay, in turn, upon being de-energized, breaks the energization path for the air valve solenoid 251 when armature 1 is moved out of engagement with its front contact and back into engagement with its back contact. As described above, de-energization of the air valve solenoid 251 effects the return of the shaft 257 to its upward position at which position the shaft moves armature 260 into engagement with its front contact thereby coupling the source of positive battery 272 over conductors 273, 278 and 279, to the clutch magnet 50 of the tape reader which, as usual, steps the tape 52 in the tape reader to bring the character C into position to be sensed or read by the tape reader. Upon the character C being sensed, the C or off relay is energized and, in the usual manner, the control system is returned to normal.

It will be understood that a multiple head spindle could be controlled in the same manner, such would require, substantially, only the duplication of the circuit of FIG. 9 for each spindle of the multiple head and that the control characters for operating each head of the spindle be programed into the control tape.

*Reproduction of automation data*

As mentioned above in regard to the provision of the plug board 82, it becomes necessary frequently to reproduce the automation data contained in the storage medium of a machine automation system. This is illustrated most graphically in the field of tape controlled automation systems wherein the tape must be reproduced frequently to permit other tape controlled automation systems to program other machine tools.

Generally in the machine automation field, the storage medium and the device which scans or senses the medium are integral parts of the automation system and are capable of no separate utilization. This is particularly true in the tape controlled machine field wherein the tape reader is an integral part of the automation device or system. Thus to reproduce the automation data in the punched tape requires an additional tape reader which, of course, increases the cost of the automation process.

The plug board 82 of the present invention can be wired so as to interconnect the relays and attendant circuitry of the control circuit 18, FIG. 1 to permit the tape reader 15 to transmit to a recorder, for example, a telegraph reperforator or a teletypewriter, and thereby reproduce the data information for use by other automation systems or to print the groups of control characters so as to be easily read by an operator, respectively.

A typical telegraph reperforator for reproducing the tape is disclosed in Patent No. 1,884,743, granted October 25, 1932 to E. E. Kleinschmidt and a typical teletypewriter is disclosed in Patent No. 1,904,164, granted to S. Morton et al. on April 18, 1933; the patents are hereby incorporated by reference.

FIGS. 12 through 15, when assembled as shown in FIG. 16, illustrate the plug board 82; the relays of the control circuit 18; the distributor and transmitter clutches and associated contacts of the tape reader 15, disclosed by way of example in the aforementioned Teletype Bulletin 242B which is hereby incorporated by reference as if fully reproduced herein; and the control magnet of a recorder or reproducing device. The plurality of small circles represent the physical and electrical engagements of the pins 86 and sockets 89 of the plug board 82 shown in FIG. 10.

Referring now to the assembled FIGS. 12 through 15, the distributor clutch magnet 300 and its associated contacts 301 to 307, inclusive, are disposed, in schematic form, vertically along the left-hand side of the figures, and the transmitter clutch 312 and associated controls are shown along the right-hand side of the assembled figures. The control relays, in particular control relays 321 through 325 and their associated armatures and contacts are shown in the center of the figures, and the push buttons and sources of potential or battery are shown in general, along the top of the figures.

The control relays 321 through 325 are energized selectively in accordance with the setting of the sensing pins of the tape reader disclosed in the incorporated bulletin, e.g., should the tape reader be sensing the character Y which has the levels Nos. 1, 3 and 5 perforated in the Baudot code, only relays 321, 323 and 325 woud be energized.

The control switch 328 of the tape reader incorporated by reference has a three-position switch having positions designated "start," the off position; "run," the normal operating position; and "free," at which position the feed pawl of the ratchet which steps the tape through the reader is disabled and the tape reader will continue to run but not advance the tape.

It will now be assumed that it is desired to reproduce the control characters which are punched in the tape 52, that the plug board 82 has been wired as shown in FIGS. 12 through 15, and that the tape 52 is in the tape reader 15.

Upon the closure of the run stop switch 328 an energization path is completed for the distributor clutch magnet 300 from positive 130 volts 341, conductor 343 through the now closed run stop switch 328, conductor 345, current limiting resistor 346, conductor 347, the now closed tape in contacts 348 (there being tape in the tape reader), conductor 351, the winding of the distributor clutch magnet 300 and conductor 352 to the negative 130 volt source 354. Upon energization of the distributor clutch magnet 300, the distributor cam shaft begins to rotate and in sequence opens the normally closed stop start contacts 306, closes the "C" contacts 307 and in numerical sequence closes the distributor contacts 301 through 305. The transmitter sensing pins have previously sensed a row of perforations in the tape and have energized permutatively the control relays 321 to 325, inclusive, in accordance with the sensed tape perforations. The front contacts of the control relays 321 through 325 are coupled directly to the contacts 301 through 305 of the distributor, for example, the back contact 356 of control relay 321 is connected to contact 301 by conductor 357.

The distributor magnet 330 of, for example, a reperforator, is normally held energized by positive 130 volts 341 being coupled thereto over conductor 359, through the stop start contact 306 of the distributor and over conductor 361 to the common connection 364. Hence upon the distributor shaft beginning to rotate and the stop start contacts being opened, the previously described reperforator clutch 330 energization circuit is broken and the start pulse is transmitted to the reperforator. Continued rotation of the distributor shaft is as described above, closes sequentially the distributor contacts 301 through 305 and the permutative setting in the control relays 321 through 325 are sequentially coupled to the common connections 364 and hence to the distributor clutch 330 of the reperforator, for example, distributor contacts 301 are connected to the common connection 364 by conductor 367. Accordingly, each level of the character sensed by the sensing pins of the tape reader is transmitted serially to the recorder or reperforator distributor clutch 330.

As stated above the "C" contact 307 was closed early in the cycle of the distributor shaft and upon being closed, coupled the positive 130 volts, from source 341, over conductor 369, through the now closed "C" contacts 307, over conductor 371, through the winding of the transmitter clutch magnet 312 and over the conductor 372 to the source of negative 130 volts or potential 354. Late in the distributor shaft cycle, the "C" contacts 307 are opened thereby interrupting the energization path for the transmitter clutch magnet 312 which, upon release, actuates a feed pawl (shown in the incorporated bulletin) to advance the tape one step and present the next row of perforations to the sensing pins of the transmitter. Closure of the "C" set of contacts 307 and the attendant energization of the transmitter clutch magnet 312 served to store the settings of the control relays 321 through 325 during the distributor cycle or sequential closing of the distributor contacts 301 through 305.

When the run stop switch is placed in the "stop" position, the tape may be fed through the transmitter and sensed and the permutative code distributed to the distributor clutch 330 of a reperforator or teletypewriter in the manner aforesaid, upon the depression of the manually operable reader step button 374. It will be understood that upon the placement of the run stop switch in the "stop" position, the energized path for the transmitter distributor clutch magnet 300 was interrupted, i.e., run stop contacts 328 were opened. The positive 130 volts from source 341 is coupled to the reader step button terminal 374 by conductor, hence, closure of the reader step button 374 couples the potential to the reader step button terminal 375, over conductor 377, through the pulsing circuit 380, comprised of serially connected diode 381 and capacitor 382, and over conductor 383 to the pulse side of the distributor clutch magnet 300; the negative side of the distributor clutch magnet being returned to the negative source of 130 volts or potential 354 over the conductor 352 as before. Repeated depressions of the reader step button 374 repeatedly establishes the immediately, previously described, energized path for the distributor clutch magnet 300 and, hence, the tape is stepped through the tape reader 15 in step-by-step fashion under the control of the reader step button 374.

Another unique and novel aspect of the present device is the ability to permit an operator to insert a new control character into the group of control characters being reproduced. When it is desired to insert a character into the tape being prepared by the recorder, i.e., reperforator or teletypewriter, such operation is initiated by the placement of the run stop switch in the free position which opens the run stop contacts 328 and disables the feed pawl associated with the transmitter clutch magnet 312 thereby causing in the manner aforesaid, the tape feed ratchet to be free wheeling and the tape not to be stepped upon deenergization of the transmitter clutch 312. Hence, repeated depressions of the reader step button 374 causes the repeated energization of the distributor clutch magnet 300 and the repeated transmission of the last character stored in the control relays 321 through 325 without the repeated stepping of the tape. Accordingly, any number of the last read and stored character may be placed into the tape being prepared by the reperforator by the required number of depressions of the reader step button 374.

If it is desired to place a number of blank characters, i.e., all levels being imperforate, in the tape being prepared by the reperforator, such is possible by the repeated depressions of the blank inserter push button 390. In the manner mentioned above, the reader step button 374 is repeatedly depressed to reproduce the desired characters and to advance the tape to the point where it is desired to make a character insertion at which point the run stop switch is placed in the free position. The blank inserter push button 390 is then depressed the same number of times as the number of blank characters desired to be inserted. The blank inserter push button 390, upon being depressed, removes the positive source of potential 341 from the armatures or swingers of the control relays 321 through 325 and hence is effective to place a blank, all level spacing, in storage in the control relays 321 through 325; the source of positive potential 341 is normally coupled to the armatures of the control relays over conductor 392, blank inserter push button contact 393 and conductor 394 to the common connection or bar 396 to which all of the armatures of the control relays are connected, e.g., the armature 397 of relay 321 is connected to the bar 396 by conductor 399.

It is manifest that the specific embodiments shown and described are merely illustrative of the invention and that many modifications and substitutions may be made therein without departing from the spirit and scope of the invention.

What is claimed is:

1. In an automatic machine control system for moving a movable element along a path with respect to X and Y axes, means for providing input data in terms of said movement with respect to said X and Y axes, and means in said system for translating said input data into a predetermined number of electrical connections including a commutator associated with each axis and comprising a plurality of inner sectors and a plurality of pairs of outer segments, corresponding ones of said pairs of outer segments being electrically coupled, the sum of the number of said inner sectors and said pairs of outer segments being equal to the smallest sum of two factors of said predetermined number, and means controllable by said electrical connections for moving said movable element with respect to said X and Y axes.

2. In an automatic machine control system for moving a movable element along a path with respect to X and Y axes, means for providing input data in terms of said movement with respect to said X and Y axes, means for translating said input data into a predetermined number of electrical control circuits including a commutator associated with each axis and comprising a plurality of inner sectors being equal in number to the smaller factor of the factors of said predetermined number whose sum is the least and a plurality of pairs of outer segments being equal in number to the larger factor of the factors of said predetermined number whose sum is the least, corresponding segments of each pair of outer segments being electrically coupled, and a rotatable wiper having two brushes, one brush being engageable with said inner sectors and the other brush being engageable with said outer segments, and means controllable by said electrical control circuits for moving said movable element with respect to said X and Y axes.

3. In an automatic machine control system for moving a movable element along a path with respect to X and Y axes, means for providing input data in terms of said movement with respect to said X and Y axes, means for translating said input data into a predetermined number of electrical circuits including a commutator associated with each axis and comprising a plurality of inner sectors being arranged in circular fashion and being equal in number to the smaller factor of the factors of said predetermined number whose sum is the least, a group of outer segments being arranged in an arcuate fashion adjacent each inner sector, corresponding segments of each group of outer segments being electrically coupled, whereby the sum of the number of said inner sectors and the number of said electrically coupled corresponding segments of said groups of outer segments is equal to the smallest sum of two factors of said predetermined number, a double brush rotatable wiper spanning said inner sectors and outer segments with one brush being engageable with said inner sectors and the other brush being engageable with said outer segments, and means controllable by said electrical control circuits for moving said movable element with respect to said X and Y axes.

4. In an automatic machine control system for moving a movable element along a path with respect to X and Y axes, means for providing input data in terms of said movement with respect to said X and Y axes, means for translating said input data into a predetermined number of electrical control circuits including a commutator associated with each axis and comprising a group of inner sectors being arranged in circular fashion and being equal in number to the smaller number of the factors of said predetermined number whose sum is the least, a group of outer segments being arranged in an arcuate fashion adjacent each inner sector the segments in each group of outer segments being equal in number to the larger number of the factors of said predetermined number whose sum is the least, said segment of each group of outer segments being electrically interconnected with corresponding segments of the other group of outer segments in the order of appearance of said segments in said arcuate arrangements, and a double brush rotatable wiper spanning said inner sectors and outer segments, one brush being engageable with said inner sectors and the other brush being engageable with said outer segments, and means controllable by said electrical control circuits for moving said movable element with respect to said X and Y axes.

5. In an automatic machine control system for moving a movable element along a path with respect to X and Y axes in accordance with a program embodied in data recorded in a storage medium, means for sensing said storage medium and translating said data into electrical control signals, means programmed to respond to certain of said control signals upon presentment thereto and for moving said movable element with respect to said X and Y axes in accordance with said electrical control signals, and means responsive to other predetermined control signals to cause said movable element to continue its movement with respect to said X and Y axes an additional distance determined by the number of consecutive appearances of said other control signals in said storage medium.

6. In an automatic machine control system for moving a movable element along a path with respect to X and Y axes in accordance with a program embodied in data recorded in a storage medium, means for sensing said stored data and for translating said stored data into electrical control signals, control means for moving said movable element with respect to said X and Y axes, and means for presenting said electrical control signals to said control means, said control means being programmed to recognize predetermined ones of said electrical control signals presented thereto and being operable to move said movable element with respect to said X and Y axes in accordance with said electrical control signals, said control means being also responsive to other predetermined control signals to cause said movable element to continue its movement with respect to said X and Y axes an additional distance determined by the number of consecutive appearances of said other control signals in said storage medium.

7. In a commutator for making a predetermined number of electrical connections, a plurality of inner sectors, a plurality of pairs of outer segments, corresponding ones of said pairs of outer segments being electrically coupled, the sum of the number of said inner sectors and said pairs of outer segments being equal to the smallest sum of two factors of said predetermined number, and a rotatable wiper spanning said inner sectors and outer segments.

8. In a commutator for making a predetermined number of electrical connections, a plurality of inner sectors being equal in number to the smaller factor of the factors of said predetermined number whose sum is the least, a plurality of pairs of outer segments being equal in number to the larger factor of the factors of said predetermined number whose sum is the least, corresponding ones of said pairs of outer segments being electrically coupled, and a rotatable wiper having two brushes, one brush being engageable with said inner sectors and the other brush being engageable with said outer segments.

9. In a commutator for making a predetermined number of electrical connections within 360°, a plurality of inner sectors being arranged in circular fashion and being equal in number to the smaller factor of the factors of said predetermined number whose sum is the least, a plurality of outer segments being arranged in an arcuate fashion adjacent each inner sector and each plurality of outer segments being equal in number to the larger factor of the factors of said predetermined number whose sum is the least, and a double brush rotatable wiper spanning said inner sectors and outer segments, one brush being engageable with said inner sectors and one brush being engageable with said outer segments.

10. In an automatic machine control system for moving a work table along a path with respect to X and Y axes and for moving a work tool secured in a spindle into engagement with a work piece secured to said work table, means for providing input data in terms of said movement with respect to said X and Y axes, and means for translating said input data into a predetermined number of electrical connections including a commutator associated with each of said axes and comprising a plurality of inner sectors and a plurality of pairs of outer segments, corresponding ones of said pairs of outer segments being electrically coupled, the sum of the number of said inner sectors and said pairs of outer segments being equal to the sum of the two factors of said predetermined number whose sum is the smallest, means controllable by said electrical connections for moving said work table with respect to said X and Y axes and for moving said work tool engagement with said work piece in timed relation with the movement of said work table.

11. In an automatic machine control system for moving a work table along a path with respect to X and Y axes and for moving a work tool secured in a spindle into engagement with a work piece secured to said work table, means for providing input data in terms of said movement with respect to said X and Y axes, means for translating said input data into a predetermined number of electrical circuits including a commutator associated with each of said axes and comprising a plurality of inner sectors being arranged in circular fashion and being equal in number to the smaller number of the factors of said predetermined number whose sum is the least, a group of outer segments being arranged in an arcuate fashion adjacent each inner sector, corresponding segments of each group of outer segments being electrically coupled, whereby the sum of the number of said inner sectors and the number of said electrically coupled corresponding segments of said groups of outer segments is equal to the smallest sum of two factors of said predetermined number, a double brush rotatable wiper spanning said inner sectors and outer segments with one brush being engageable with said inner sectors and the other brush being engageable with said outer segments, means controllable by said electrical control circuits for moving said work table element with respect to said X and Y axes, and additional means for moving said work table into engagement with said work piece in timed relation with the movements of said work table.

12. In an automatic machine control system for moving a movable element along a path with respect to X and Y axes, means for sensing code indicia stored in a record strip for providing input data in terms of said movement with respect to said X and Y axes, a fan circuit, means under the control of said code indicia for establishing a circuit through said fan circuit, a plurality of relay means governed by said fan circuit for establishing a condition, a commutator associated with each axis and comprising a plurality of inner sectors and a plurality of pairs of outer segments, corresponding ones of said pairs of outer segments being electrically coupled, certain of said relay means being identified with said inner sectors and other of said relay means being identified with said pairs of outer segments, electrical means operably associated with said plurality of relay means and said commutators, and motive power means operably associated with said commutators and said movable element, whereby said movable element is moved in a predetermined path with respect to said X and Y axes in accordance with the condition established in response to said input data.

13. In an automatic machine control system for moving a movable element along a path with respect to X and Y axes, means for sensing code indicia stored in a record strip for providing input data in terms of said movement with respect to said X and Y axes, a fan circuit, means under the control of said code indicia for establishing a circuit through said fan circuit, a plurality of relay means governed by said fan circuit for establishing a condition, a commutator associated with each axis and comprising a plurality of inner sectors and a plurality of pairs of outer segments, corresponding ones of said pairs of outer segments being electrically coupled, certain of said relay means being identified with said inner sectors and other said relay means being identified with said pairs of outer segments, electrical circuit means operably associated with said plurality of relay means and said commutators, motive power means operably associated with said commutators and said movable element, and further of said relay means effective to govern the direction of rotation of said motive power means, whereby said movable element is moved in a predetermined path with respect to said X and Y axes in accordance with the condition established in response to said input data.

14. In an automatic machine control system for moving a movable element along a path with respect to X and Y axes, perforated tape controlled means for providing permutation code input data in terms of said movement with respect to said X and Y axes, a fan circuit means for converting said permutation code input data into single control signal impulses, a plurality of control relays responsive to said impulses, a commutator associated with each axis and comprising a plurality of inner sectors and a plurality of pairs of outer segments, corresponding ones of said pairs of outer segments being electrically coupled, whereby the sum of the number of said inner sectors and said pairs of outer segments is equal to the sum of the two factors of said predetermined number whose sum is the smallest, certain of said control relays being identified with said inner sectors and other of said relays being identified with said pairs of outer segments, electrical circuit means operably associated with said control relays and said commutators, and motive power means operably associated with said commutators and said movable element, whereby said movable element is moved in predetermined directions with respect to said X and Y axes in response to said input data.

15. In an automatic machine control system for moving a movable element along a path with respect to X and Y axes, perforated tape controlled means for providing permutation code input data in terms of said movement with respect to said X and Y axes, a fan circuit means for converting said permutation code input data into single control signal impulses, a plurality of control relays responsive to said impulses, a commutator associated with each axis and comprising a plurality of inner sectors and a plurality of pairs of outer segments, corresponding ones of said pairs of outer segments being electrically coupled, certain of said control relays being identified with said inner sectors and other of said control relays being identified with said pairs of outer segments, electrical circuit means operably associated with said control relays and said commutators, and motive power means operably associated with said commutators and said movable element, whereby said movable element is moved in a predetermined path with respect to said X and Y axes in response to said input data.

16. In an automatic machine control system for moving a movable element along a path with respect to X and Y axes, means for sensing code indicia stored in a record strip for providing input data in terms of said movement with respect to said X and Y axes, a fan circuit, means under the control of said code indicia for establishing a circuit through said fan circuit, a predetermined number of relay means governed by said fan circuit for establishing a condition, a commutator associated with each axis and comprising a plurality of inner sectors and a plurality of pairs of outer segments, corresponding ones of said pairs of outer segments being electrically coupled, certain of said relay means being identified with said inner sectors and certain other of said relay means being identified with said pairs of outer segments, the sum of the number of said inner sectors and said pairs of outer segments being equal to the sum of the two factors of said predetermined number whose sum is the smallest, electrical circuit means operably associated with said relay means and said commutators, motive power means operably associated with said commutators and said movable element, and additional relay means governed by said fan circuit to determine the direction of rotation of said motive power means, whereby said movable element is moved in a predetermined path with respect to said X and Y axes in accordance with the condition established in response to said input data.

17. In combination in an automatic machine control system, a machine having a base, means positionable upon said base for rectilinear movement, a first driving means mounted upon said positionable means to move said positionable means, a commutator operably associated with said first driving means, a work holding means slidably mounted upon said positionable means for orthogonal movement with respect to said positionable means, a second driving means mounted upon said positionable means to move said work holding means, a commutator operably associated with said second driving means, means for sensing code indicia stored in a record strip for providing input data in terms of said movements, a fan circuit, means under the control of said code indicia for establishing a circuit through said fan circuit, a plurality of relay means governed by said fan circuit for establishing a condition, and electrical circuit means operably associated with said plurality of relay means and said commutators for activating said first and second driving means, whereby said positionable means and said work holding means are moved in predetermined paths with respect to each other in accordance with the condition established in response to said input data.

18. In combination in an automatic machine control system, a machine having a base, a first means positionable upon said base for movement with respect to an X axis, a second means supported by said first means for movement with respect to a Y axis, a pair of driving means mounted upon said first means, a commutator operably associated with each one of said pair of driving means, means for providing input data in terms of said movements with respect to said X and Y axes, and electrical circuit means including said commutators for activating said driving means, whereby said first and second means are moved in a predetermined path with respect to said X and Y axes in response to said input data.

19. In combination in an automatic machine control system, a machine having a base, a first means positionable upon said base for movement with respect to an X axis, a second means supported by said first means for movement with respect to a Y axis, a pair of driving means mounted upon said first means, a commutator operably associated with each one of said pair of driving means, a work tool, means for moving said work tool into engagement with a work piece secured to said second means, means for providing input data in terms of said movements, and electrical circuit means including said commutators for activating said driving means and said means for moving said work tool, whereby said first and second means are moved in a predetermined path with respect to said X and Y axes and said work tool is moved into engagement with said work piece in timed relation with the movement of said first and second means in response to said input data.

20. In combination in an automatic machine control system, a machine having a base, a first means positionable upon said base for movement with respect to an X axis, a second means supported by said first means for movement with respect to a Y axis, a pair of driving means mounted upon said first means, a commutator for making a predetermined number of electrical connections associated with each one of said pair of driving means, each commutator comprising a plurality of inner sectors and a plurality of pairs of outer segments, corresponding ones of said pairs of outer segments being electrically coupled, whereby the sum of the number of said inner sectors and said pairs of outer segments is equal to the smallest sum of two factors of said predetermined number, means for providing input data in terms of said movements with respect to said X and Y axes, and electrical circuit means including said commutators for activating said driving means, whereby said first and second means are moved in a predetermined path with respect to said X and Y axes in response to said input data.

21. In combination in an automatic machine control system, a machine having a base, a first means positionable upon said base for movement with respect to an X axis, a second means supported by said first means for movement with respect to a Y axis, a pair of driving means mounted upon said first means, a commutator for making a predetermined number of electrical connections associated with each one of said pair of driving means, each commutator comprising a plurality of inner sectors and a plurality of pairs of outer segments, corresponding ones of said pairs of outer segments being electrically coupled, whereby the sum of the number of said inner sectors and said pairs of outer segments is equal to the smallest sum of two factors of said predetermined number, a work tool, means for moving said work tool into engagement with a work piece secured to said second means, means for providing input data in terms of said movements, and electrical circuit means including said commutators for activating said driving means and said means for moving said work tool, whereby said first and second means are moved in a predetermined path with respect to said X and Y axes and said work tool is moved into engagement with said work piece in timed relation with the movement of said first and second means in response to said input data.

References Cited by the Examiner

UNITED STATES PATENTS

| | | | |
|---|---|---|---|
| 349,715 | 9/1886 | Higham et al. | 307—145 |
| 2,475,245 | 7/1949 | Leaver et al. | 318—162 |
| 2,630,722 | 3/1953 | Benzon | 77—1 |
| 2,838,694 | 6/1958 | Hiden | 307—145 |
| 2,943,251 | 6/1960 | Hull | 318—162 |
| 3,063,311 | 11/1962 | Beckwith et al. | 318—162 |

OTHER REFERENCES

"Numerically-Controlled Point-to-Point Positioning Systems, Part I." Reprinted from Control Engineering, published by McGraw-Hill Publishing Co., January 1958 (pages 7, 15, 18 and 19 relied on).

JOHN F. COUCH, *Primary Examiner.*

JOHN C. CHRISTIE, *Examiner.*

W. S. LAWSON, *Assistant Examiner.*